United States Patent
Baca et al.

(10) Patent No.: US 8,469,397 B2
(45) Date of Patent: Jun. 25, 2013

(54) STITCH PATTERNS FOR RESTRAINT-MOUNTED AIRBAGS AND ASSOCIATED SYSTEMS AND METHODS

(75) Inventors: Andre Baca, Laveen, AZ (US); Kevin Keeslar, Chandler, AZ (US)

(73) Assignee: AmSafe, Inc., Phoenix, AZ (US)

( * ) Notice: Subject to any disclaimer, the term of this patent is extended or adjusted under 35 U.S.C. 154(b) by 86 days.

(21) Appl. No.: 13/086,134

(22) Filed: Apr. 13, 2011

(65) Prior Publication Data
US 2012/0261911 A1    Oct. 18, 2012

(51) Int. Cl.
*B60R 21/18*    (2006.01)

(52) U.S. Cl.
USPC .......................................................... 280/733

(58) Field of Classification Search
USPC ............. 280/733, 728.1, 730.1, 730.2, 743.2; 244/122 AG, 122 B
See application file for complete search history.

(56) References Cited

U.S. PATENT DOCUMENTS

| | | | |
|---|---|---|---|
| 2,502,206 A | 3/1950 | Creek | |
| 3,560,027 A | 2/1971 | Graham | |
| 3,766,612 A | 10/1973 | Hattori | |
| 3,970,329 A * | 7/1976 | Lewis | 280/733 |
| 5,194,755 A | 3/1993 | Rhee et al. | |
| 5,199,739 A | 4/1993 | Fujiwara et al. | |
| 5,288,104 A | 2/1994 | Chen et al. | |
| 5,299,827 A | 4/1994 | Igawa et al. | |
| 5,324,071 A | 6/1994 | Gotomyo et al. | |
| 5,335,937 A | 8/1994 | Uphues et al. | |
| 5,335,939 A | 8/1994 | Kuriyama et al. | |
| 5,375,875 A | 12/1994 | DiSalvo et al. | |
| 5,400,867 A | 3/1995 | Muller et al. | |
| 5,411,289 A | 5/1995 | Smith et al. | |
| 5,456,491 A | 10/1995 | Chen et al. | |
| 5,465,999 A | 11/1995 | Tanaka et al. | |
| 5,470,103 A | 11/1995 | Vaillancourt et al. | |
| 5,472,231 A | 12/1995 | France | |
| 5,473,111 A | 12/1995 | Hattori et al. | |
| 5,485,041 A | 1/1996 | Meister | |
| 5,492,360 A | 2/1996 | Logeman et al. | |
| 5,499,840 A | 3/1996 | Nakano et al. | |
| 5,597,178 A | 1/1997 | Hardin, Jr. | |
| 5,609,363 A | 3/1997 | Finelli | |
| 5,672,916 A | 9/1997 | Mattes et al. | |
| 5,734,318 A | 3/1998 | Nitschke et al. | |

(Continued)

FOREIGN PATENT DOCUMENTS

| | | |
|---|---|---|
| DE | 4116162 | 11/1992 |
| DE | 4211209 | 10/1993 |

(Continued)

OTHER PUBLICATIONS

"Takata Melds Air Bag with Seat Belt," The Japan Times, Nov. 27, 2010, 7 pages.

(Continued)

*Primary Examiner* — Joseph Rocca
(74) *Attorney, Agent, or Firm* — Perkins Coie LLP

(57) ABSTRACT

Stitch patterns for inflatable personal restraint systems and associated systems and methods. A stitch pattern between a web of a restraint and an airbag mounted to the restraint has a continuous, or curvilinear pattern to reduce stress concentrations. The stitch pattern can be applied to the web, the airbag, and a gas tube in a single stitching procedure.

23 Claims, 4 Drawing Sheets

U.S. PATENT DOCUMENTS

| | | | |
|---|---|---|---|
| 5,752,714 A | 5/1998 | Pripps et al. | |
| 5,758,900 A | 6/1998 | Knoll et al. | |
| 5,765,869 A | 6/1998 | Huber | |
| 5,772,238 A | 6/1998 | Breed et al. | |
| 5,803,489 A | 9/1998 | Nusshor et al. | |
| 5,839,753 A | 11/1998 | Yaniv et al. | |
| 5,851,055 A | 12/1998 | Lewis | |
| 5,863,065 A | 1/1999 | Boydston et al. | |
| 5,868,421 A | 2/1999 | Eyrainer et al. | |
| 5,871,230 A | 2/1999 | Lewis | |
| 5,886,373 A | 3/1999 | Hosogi et al. | |
| 5,906,391 A | 5/1999 | Weir et al. | |
| 5,924,726 A | 7/1999 | Pan et al. | |
| 5,927,748 A | 7/1999 | O'Driscoll | |
| 5,927,754 A * | 7/1999 | Patzelt et al. | 280/739 |
| 5,947,513 A | 9/1999 | Lehto | |
| 5,975,565 A | 11/1999 | Cuevas | |
| 5,984,350 A | 11/1999 | Hagan et al. | |
| 5,988,438 A | 11/1999 | Lewis et al. | |
| RE36,587 E | 2/2000 | Tanaka et al. | |
| 6,019,388 A | 2/2000 | Okazaki et al. | |
| 6,042,139 A | 3/2000 | Knox | |
| RE36,661 E | 4/2000 | Tanaka et al. | |
| 6,059,312 A | 5/2000 | Staub et al. | |
| 6,065,772 A | 5/2000 | Yamamoto et al. | |
| 6,082,763 A | 7/2000 | Kokeguchi et al. | |
| 6,113,132 A | 9/2000 | Saslecov et al. | |
| 6,126,194 A | 10/2000 | Yaniv et al. | |
| 6,135,489 A | 10/2000 | Bowers | |
| 6,142,508 A | 11/2000 | Lewis | |
| 6,142,511 A | 11/2000 | Lewis | |
| 6,155,598 A | 12/2000 | Kutchey | |
| 6,158,765 A | 12/2000 | Sinnhuber et al. | |
| 6,168,195 B1 | 1/2001 | Okazaki et al. | |
| 6,224,097 B1 | 5/2001 | Lewis | |
| 6,254,121 B1 | 7/2001 | Fowler et al. | |
| 6,260,572 B1 | 7/2001 | Wu | |
| 6,276,714 B1 | 8/2001 | Yoshioka | |
| 6,293,582 B1 | 9/2001 | Lewis | |
| 6,325,412 B1 | 12/2001 | Pan | |
| 6,336,657 B1 | 1/2002 | Akaba et al. | |
| 6,378,898 B1 | 4/2002 | Lewis et al. | |
| 6,382,666 B1 | 5/2002 | Devonport | |
| 6,390,502 B1 | 5/2002 | Ryan et al. | |
| 6,406,058 B1 | 6/2002 | Devonport et al. | |
| 6,419,263 B1 | 7/2002 | Busgen et al. | |
| 6,425,601 B1 | 7/2002 | Lewis | |
| 6,439,600 B1 | 8/2002 | Adkisson | |
| 6,442,807 B1 | 9/2002 | Adkisson | |
| 6,443,496 B2 | 9/2002 | Campau | |
| 6,460,878 B2 | 10/2002 | Eckert et al. | |
| 6,547,273 B2 | 4/2003 | Grace et al. | |
| 6,557,887 B2 | 5/2003 | Wohllebe et al. | |
| 6,585,289 B1 | 7/2003 | Hammer et al. | |
| 6,616,177 B2 | 9/2003 | Thomas et al. | |
| 6,648,367 B2 | 11/2003 | Breed et al. | |
| 6,688,642 B2 | 2/2004 | Sollars, Jr. | |
| 6,705,641 B2 | 3/2004 | Schneider et al. | |
| 6,729,643 B1 | 5/2004 | Bassick et al. | |
| 6,739,264 B1 | 5/2004 | Hosey et al. | |
| 6,746,074 B1 | 6/2004 | Kempf et al. | |
| 6,749,220 B1 | 6/2004 | Wipasuramonton et al. | |
| 6,758,489 B2 | 7/2004 | Xu | |
| 6,764,097 B2 | 7/2004 | Kelley et al. | |
| 6,769,714 B2 | 8/2004 | Hosey et al. | |
| 6,776,434 B2 | 8/2004 | Ford et al. | |
| 6,779,813 B2 | 8/2004 | Lincoln et al. | |
| 6,789,818 B2 | 9/2004 | Gioutsos et al. | |
| 6,789,819 B1 | 9/2004 | Husby | |
| 6,789,821 B2 | 9/2004 | Zink et al. | |
| 6,793,243 B2 | 9/2004 | Husby | |
| 6,796,578 B2 | 9/2004 | White et al. | |
| 6,802,527 B2 | 10/2004 | Schmidt et al. | |
| 6,802,530 B2 | 10/2004 | Wipasuramonton et al. | |
| 6,808,198 B2 | 10/2004 | Schneider et al. | |
| 6,823,645 B2 | 11/2004 | Ford | |
| 6,824,163 B2 | 11/2004 | Sen et al. | |
| 6,825,654 B2 | 11/2004 | Pettypiece, Jr. et al. | |
| 6,830,263 B2 | 12/2004 | Xu et al. | |
| 6,830,265 B2 | 12/2004 | Ford | |
| 6,837,079 B1 * | 1/2005 | Takeuchi | 66/198 |
| 6,838,870 B2 | 1/2005 | Pettypiece, Jr. et al. | |
| 6,840,534 B2 | 1/2005 | Lincoln et al. | |
| 6,840,537 B2 | 1/2005 | Xu et al. | |
| 6,840,539 B2 | 1/2005 | Pettypiece, Jr. | |
| 6,843,503 B2 | 1/2005 | Ford | |
| 6,846,005 B2 | 1/2005 | Ford et al. | |
| 6,851,374 B1 | 2/2005 | Kelley et al. | |
| 6,857,657 B2 | 2/2005 | Canterberry et al. | |
| 6,860,509 B2 | 3/2005 | Xu et al. | |
| 6,863,301 B2 | 3/2005 | Ford et al. | |
| 6,869,101 B2 | 3/2005 | White et al. | |
| 6,871,872 B2 | 3/2005 | Thomas | |
| 6,871,874 B2 | 3/2005 | Husby et al. | |
| 6,874,814 B2 | 4/2005 | Hosey et al. | |
| 6,882,914 B2 | 4/2005 | Gioutsos et al. | |
| 6,886,856 B2 | 5/2005 | Canterberry et al. | |
| 6,886,858 B2 | 5/2005 | Olson | |
| 6,887,325 B2 | 5/2005 | Canterberry et al. | |
| 6,894,483 B2 | 5/2005 | Pettypiece, Jr. et al. | |
| 6,905,134 B2 | 6/2005 | Saiguchi et al. | |
| 6,908,104 B2 | 6/2005 | Canterberry et al. | |
| 6,923,483 B2 | 8/2005 | Curry et al. | |
| 6,929,283 B2 | 8/2005 | Gioutsos et al. | |
| 6,932,378 B2 | 8/2005 | Thomas | |
| 6,942,244 B2 | 9/2005 | Roychoudhury | |
| 6,951,350 B2 | 10/2005 | Heidorn et al. | |
| 6,951,532 B2 | 10/2005 | Ford | |
| 6,953,204 B2 | 10/2005 | Xu et al. | |
| 6,955,377 B2 | 10/2005 | Cooper et al. | |
| 6,957,828 B2 | 10/2005 | Keeslar et al. | |
| 6,962,363 B2 | 11/2005 | Wang et al. | |
| 6,962,364 B2 | 11/2005 | Ju et al. | |
| 6,974,154 B2 | 12/2005 | Grossert et al. | |
| 6,983,956 B2 | 1/2006 | Canterberry et al. | |
| 6,994,372 B2 | 2/2006 | Ford et al. | |
| 7,007,973 B2 | 3/2006 | Canterberry et al. | |
| 7,021,653 B2 | 4/2006 | Burdock et al. | |
| 7,029,024 B2 | 4/2006 | Baumbach | |
| 7,036,844 B2 | 5/2006 | Hammer et al. | |
| 7,044,500 B2 | 5/2006 | Kalandek et al. | |
| 7,044,502 B2 | 5/2006 | Trevillyan et al. | |
| 7,048,298 B2 | 5/2006 | Arwood et al. | |
| 7,052,034 B2 | 5/2006 | Lochmann et al. | |
| 7,055,856 B2 | 6/2006 | Ford et al. | |
| 7,063,350 B2 | 6/2006 | Steimke et al. | |
| 7,070,203 B2 | 7/2006 | Fisher et al. | |
| 7,081,692 B2 | 7/2006 | Pettypiece, Jr. et al. | |
| 7,090,246 B2 | 8/2006 | Lincoln et al. | |
| 7,107,133 B2 | 9/2006 | Fisher et al. | |
| 7,121,581 B2 | 10/2006 | Xu et al. | |
| 7,121,628 B2 | 10/2006 | Lo | |
| 7,131,662 B2 | 11/2006 | Fisher et al. | |
| 7,131,664 B1 | 11/2006 | Pang et al. | |
| 7,147,245 B2 | 12/2006 | Florsheimer et al. | |
| 7,152,880 B1 | 12/2006 | Pang et al. | |
| 7,163,236 B2 | 1/2007 | Masuda et al. | |
| 7,198,285 B2 | 4/2007 | Hochstein-Lenzen et al. | |
| 7,198,293 B2 | 4/2007 | Olson | |
| 7,213,836 B2 | 5/2007 | Coon et al. | |
| 7,216,891 B2 | 5/2007 | Biglino | |
| 7,216,892 B2 | 5/2007 | Baumbach et al. | |
| 7,222,877 B2 | 5/2007 | Wipasuramonton et al. | |
| 7,255,364 B2 | 8/2007 | Bonam et al. | |
| 7,261,315 B2 | 8/2007 | Hofmann et al. | |
| 7,261,316 B1 | 8/2007 | Salmo et al. | |
| 7,264,269 B2 | 9/2007 | Gu et al. | |
| 7,267,361 B2 | 9/2007 | Hofmann et al. | |
| 7,270,344 B2 | 9/2007 | Schirholz et al. | |
| 7,278,656 B1 | 10/2007 | Kalandek | |
| 7,281,733 B2 | 10/2007 | Pieruch et al. | |
| 7,303,206 B2 | 12/2007 | Kippschull et al. | |
| 7,318,599 B2 | 1/2008 | Magdun | |
| 7,320,479 B2 | 1/2008 | Trevillyan et al. | |
| 7,325,829 B2 | 2/2008 | Kelley et al. | |
| 7,341,276 B2 | 3/2008 | Kelley et al. | |
| 7,347,449 B2 | 3/2008 | Rossbach et al. | |

| | | |
|---|---|---|
| 7,350,806 B2 | 4/2008 | Ridolfi et al. |
| 7,354,064 B2 | 4/2008 | Block et al. |
| 7,367,590 B2 | 5/2008 | Koning et al. |
| 7,380,817 B2 | 6/2008 | Poli et al. |
| 7,390,018 B2 | 6/2008 | Ridolfi et al. |
| 7,398,994 B2 | 7/2008 | Poli et al. |
| 7,401,805 B2 | 7/2008 | Coon et al. |
| 7,401,808 B2 | 7/2008 | Rossbach et al. |
| 7,404,572 B2 | 7/2008 | Salmo et al. |
| 7,407,183 B2 | 8/2008 | Ford et al. |
| 7,431,332 B2 | 10/2008 | Wipasuramonton et al. |
| 7,452,002 B2 | 11/2008 | Baumbach et al. |
| 7,506,891 B2 | 3/2009 | Quioc et al. |
| 7,513,524 B2 | 4/2009 | Oota et al. |
| 7,533,897 B1 | 5/2009 | Xu et al. |
| 7,625,008 B2 | 12/2009 | Pang et al. |
| 7,658,400 B2 | 2/2010 | Wipasuramonton et al. |
| 7,658,406 B2 | 2/2010 | Townsend et al. |
| 7,658,407 B2 | 2/2010 | Ford et al. |
| 7,658,409 B2 | 2/2010 | Ford et al. |
| 7,665,761 B1 | 2/2010 | Green et al. |
| 7,703,796 B2 | 4/2010 | Manire et al. |
| 7,708,312 B2 | 5/2010 | Kalandek |
| 7,753,402 B2 | 7/2010 | Volkmann et al. |
| 7,789,418 B2 | 9/2010 | Wipasuramonton et al. |
| 7,980,590 B2 | 7/2011 | Foubert et al. |
| 2001/0028161 A1 | 10/2001 | Hoagland |
| 2006/0282203 A1* | 12/2006 | Hasebe et al. .................. 701/45 |
| 2007/0080528 A1* | 4/2007 | Itoga et al. .................... 280/733 |
| 2010/0115737 A1 | 5/2010 | Foubert |
| 2012/0256403 A1 | 10/2012 | Shields |

FOREIGN PATENT DOCUMENTS

| | | |
|---|---|---|
| DE | 19742151 | 4/1998 |
| DE | 10041042 | 5/2001 |
| EP | 0639481 | 2/1995 |
| EP | 0765776 | 4/1997 |
| EP | 1101660 | 5/2001 |
| EP | 2028103 A2 | 2/2009 |
| FR | 2703011 | 9/1994 |
| GB | 2306876 | 5/1997 |
| GB | 2368050 | 4/2002 |
| GB | 2410009 | 7/2005 |
| JP | 63258239 | 10/1988 |
| JP | 1083436 | 3/1989 |
| JP | 11189117 | 7/1999 |
| WO | WO-8807947 | 10/1988 |
| WO | WO-99/39940 | 8/1999 |
| WO | WO-99/42336 | 8/1999 |
| WO | WO-0100456 | 1/2001 |
| WO | WO-0168413 | 9/2001 |

OTHER PUBLICATIONS

International Search Report and Written Opinion; International Patent Application No. PCT/US2011/043255; Filed: Jul. 7, 2011; Applicant: AnnSafe, Inc.; Mailed on Dec. 9, 2011.

* cited by examiner

STITCH PATTERNS FOR RESTRAINT-MOUNTED AIRBAGS AND ASSOCIATED SYSTEMS AND METHODS

TECHNICAL FIELD

The following disclosure relates generally to stitch patterns for use with inflatable personal restraint systems, and associated systems and methods.

BACKGROUND

Although a seat belt will generally restrain a person during an accident or similar event in a car, aircraft, or other vehicle, an airbag can provide additional protection. In cars, for example, airbags can deploy from the steering column, dashboard, side panel, etc., to protect the driver and/or passenger(s). During a sudden deceleration of the car, such as in a collision, the airbag rapidly inflates and deploys in front of, or to the side of, the driver and/or passenger(s). An airbag positioned in the steering column, for example, can expand in front of the driver to cushion his torso and head. The airbag can prevent the driver's head from hitting the steering wheel, and can also reduce the likelihood of whiplash.

Although the airbags described above are common in automobiles, other types of airbags are used in other types of vehicles. These other types of airbags are useful because airbags that deploy from a specific location in an automobile (e.g., from the steering column) may not be as effective in other types of vehicles, or for occupants in different locations in a vehicle. To accommodate different vehicles and different occupant positions, airbags have been developed that deploy from seat belts. Such airbags can deploy from, for example, a lap belt and/or shoulder belt to provide additional protection during a sudden deceleration. Seat belt-deployable airbags can be used in various types of vehicles, including land-based vehicles, aircraft, etc.

Due to the variety of ways in which a seatbelt can be oriented or twisted during use or during a crash, airbags affixed to seatbelts can experience different stresses at attachment points than airbags mounted to rigid structures such as a steering wheel or a doorframe. Moreover, the process of attaching an airbag to a seatbelt and packaging the airbag can also be time-consuming and labor-intensive.

DETAILED DESCRIPTION

The present disclosure describes fastening systems for attaching an airbag to a personal restraint, such as a seatbelt, and associated systems and methods. Many specific details are set forth in the following description and in FIGS. 1-3B to provide a thorough understanding of various embodiments of the disclosure. Other details describing well-known structures and systems often associated with airbags, restraint systems, etc., however, are not set forth below to avoid unnecessarily obscuring the description of the various embodiments of the disclosure.

Figure 1:
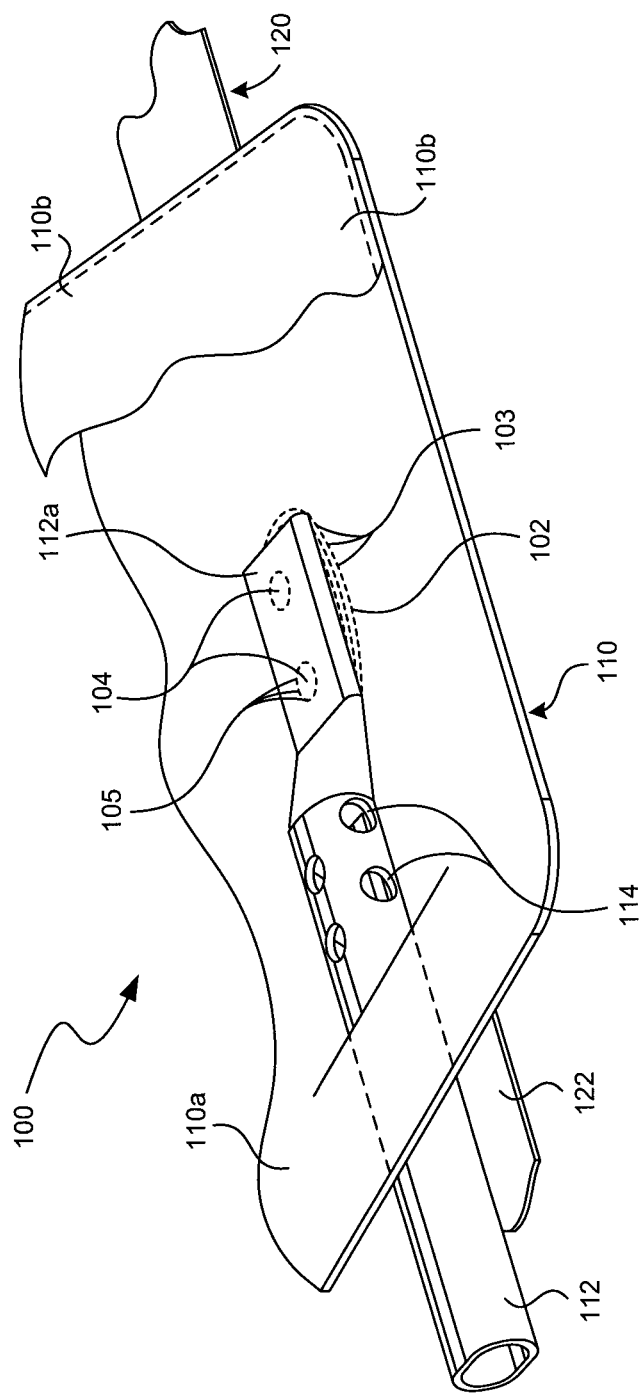
FIG. 1 is a top isometric view of a fastening system for attaching an airbag to a restraint configured according to embodiments of the present disclosure.

FIG. 1 is a top isometric view of a fastening system 100 for attaching an airbag 110 to a personal restraint 120 configured according to embodiments of the present disclosure. In some embodiments, the restraint 120 can be a seatbelt (e.g. lap belt, shoulder strap, etc.) for an aircraft. In other embodiments, the restraint 120 can be a seatbelt or other restraint for another vehicle such as an automobile or watercraft. The restraint 120 can include a flexible web 122, such as a woven nylon web. In some embodiments, the web is approximately 1.92 inches wide. The airbag 110 can be formed from a first layer of material 110a ("first layer 110a") and a second layer of material 110b ("second layer 110b") sewn or glued together along an outer seam in a conventional manner. In selected embodiments, the first and second layers of material 110a, 110b are sheets of conventional airbag material, such as woven nylon fabric that may be coated with fire-resistant material and a lubricating substance as is known in the art. Only a small, cut-away portion of the second layer 110b is shown to avoid obscuring the fastening system 100. A space between the first and second layers 110a, 110b defines an interior of the airbag 110. The airbag 100 can include a gas tube 112 that is aligned with the web 122 and enters the airbag 110 through a slit 106 in the first layer 110a. The gas tube 112 can include gas exit ports 114 at an end portion 112a of the gas tube 112 that are positioned between the first layer 110a and the second layer 110b within the interior space of the airbag 110. When the airbag 110 deploys, the gas tube 112 inflates the airbag 110 rapidly in response to a signal from a corresponding controller.

In selected embodiments, the fastening system 100 includes a first stitch pattern 102 formed of a series of individual stitches 103 arranged in rows or paths, with the stitches 103 passing through the first layer 110a and the web 122 to attach the airbag 110 to the web 122. The first stitch pattern 102 can be made with the stitches 103 arranged in curved stitch paths that mitigate stresses caused during a crash or other similar event by eliminating stress concentrations that can be caused at a corner of a stitch pattern. In particular, the first stitch pattern 102 can include several concentric, elliptical, curvilinear, or oval-shaped rows of stitches 103. In other embodiments, the first stitch pattern 102 includes a spiral pattern of stitches 103. Alternatively, the first stitch pattern 102 can include circular rings or rows of stitches 103. The individual stitches 103 are generally straight due to the nature of stitches, wherein each stitch 103 is a small segment of thread pulled taut (and therefore straight) between two small holes in the web 122 made by a needle (not shown). The thread can be nylon or another suitable material. The first stitch pattern 102 of the present disclosure can be made up of several discrete stitches 103 in a line, row, or path having straight sections and curves but without sharp corners. In some embodiments, an angle between each consecutive stitch is no greater than approximately 10°. In other embodiments, the angle between each consecutive stitch is between approximately 3° and 23°. In some embodiments, the first stitch pattern 102 is approximately 2.5 inches by 1 inch. Other aspect ratios and dimensions are also possible. Some conventional stitch patterns have sharp corners, such as right angles or other, even more acute angles that can contribute to failure of a fastening system because the angled stitch pattern may cause a stress concentration. The continuous or curvilinear shape of the first stitch pattern 102 mitigates stress concentrations and therefore strengthens the fastening system 100 even when stress is applied from an unexpected direction.

In some embodiments, the first layer 110a and/or the second layer 110b can be made of a textile material having interwoven warp threads and transverse weft (or fill) threads. The warp threads can be oriented in any direction relative to the length of the web 122. Orienting the warp threads away from alignment with the length of the web 122 can provide additional strength to the layers 110a, 110b, but can cause some waste material when the layers 110a, 110b are cut to shape. In some embodiments, the additional strength is needed and thus the cost of the waste material is acceptable. In some embodiments, the airbag 110 can include a first thread orientation for the first layer 110a, and a second, different thread orientation for the second layer 110b.

In general, a stitch in a textile is strongest when the stitch is transverse to the warp threads, and weakest when the stitch is parallel with the warp threads. Orienting all the stitches 103 transverse to the warp threads, however, is both impractical and can cause a stress concentration at each of the stitches 103. The first stitch pattern 102, including stitches 103 of various angles in a continuous, curvilinear formation, offers the additional advantage of increased strength independent of the orientation of the warp threads of the layers 110a, 110b. Whether an angle between the warp threads and the length of the web 122 is zero, 45°, 90° or any other suitable orientation, at least some of the stitches 103 are transverse to the warp threads. Accordingly, the first stitch pattern 102 can be used with layers 110a, 110b having any desired warp thread orientation without weakening the bond between the web 122 and the airbag 110.

The fastening system 100 can also include a second stitch pattern 104 formed of stitches 105 to attach an end portion 112a of the gas tube 112 to the airbag 110 and the web 122. The stitches 105 of the second stitch pattern 104 can be similar to the stitches 103 of the first stitch pattern 102. Similar to the first stitch pattern 102, the second stitch pattern 104 can include curved rows (e.g. circular rows) of stitches 105 to mitigate stress concentrations in the fastening system 100. In further embodiments, the second stitch pattern 104 can pass through the web 122, the first layer 110a, and the gas tube 112. In some embodiments, the first stitch pattern 102 and the second stitch pattern 104 do not overlap, and thus none of the stitches 103 overlap with the stitches 105. Either or both of the first stitch pattern 102 and the second stitch pattern 104 can be made in a single stitching procedure. For example, a jig can temporarily hold the web 122, the first layer 110a, and the gas tube 112 in a suitable alignment before the first and/or second stitch pattern 102, 104 is sewn.

Figure 2:
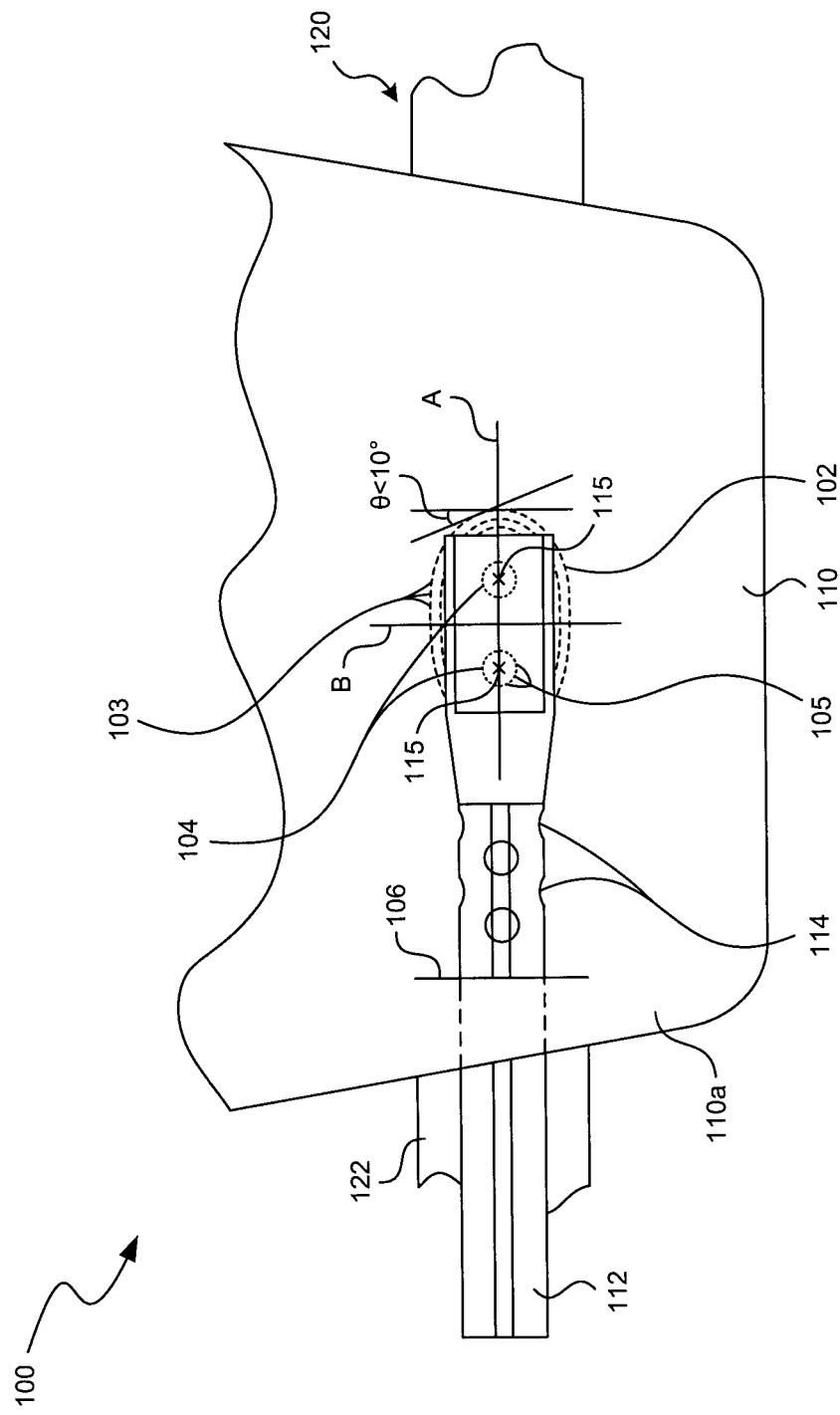
FIG. 2 is a top view of the fastening system of FIG. 1.

FIG. 2 is a top view of the fastening system 100 according to embodiments of the present disclosure in which the second layer 110b is not shown. The curved rows of stitches 103 and 105 that make up the stitch patterns 102, 104 can be formed in many different shapes. For example, the first stitch pattern 102 can be curvilinear without having a distinct oval or elliptical shape. In some embodiments, the first stitch pattern 102 can form a single, eccentric, spiraling stitch pattern. The first stitch pattern 102 can be elliptical, having a major axis A and a minor axis B. The major axis A is generally parallel with the length of the web 122, and the minor axis B is generally perpendicular to the major axis A. As defined by general geometric principles, an ellipse is defined by two points called foci, and the elliptical shape is defined as a series of points wherein the distance from any point on the ellipse to the first focus, to the second focus, and back to the point is the same distance for all the points in the ellipse. In some embodiments, at least one row of stitches of the first stitch pattern 102 defines an ellipse having two foci 115, and the circular rows of stitches 105 of the second stitch pattern 104 are centered on the foci 115. The first stitch pattern 102 can also include other rows of stitches 103 that may depart from the strict geometrical definition of an ellipse centered on the foci 115. Some of the other rows of stitches 103 can be larger than the ellipse, and some can be smaller. In some embodiments, each row of stitches 103 can be positioned a constant distance from an adjacent (larger or smaller diameter) row of stitches 103.

Figure 3A:
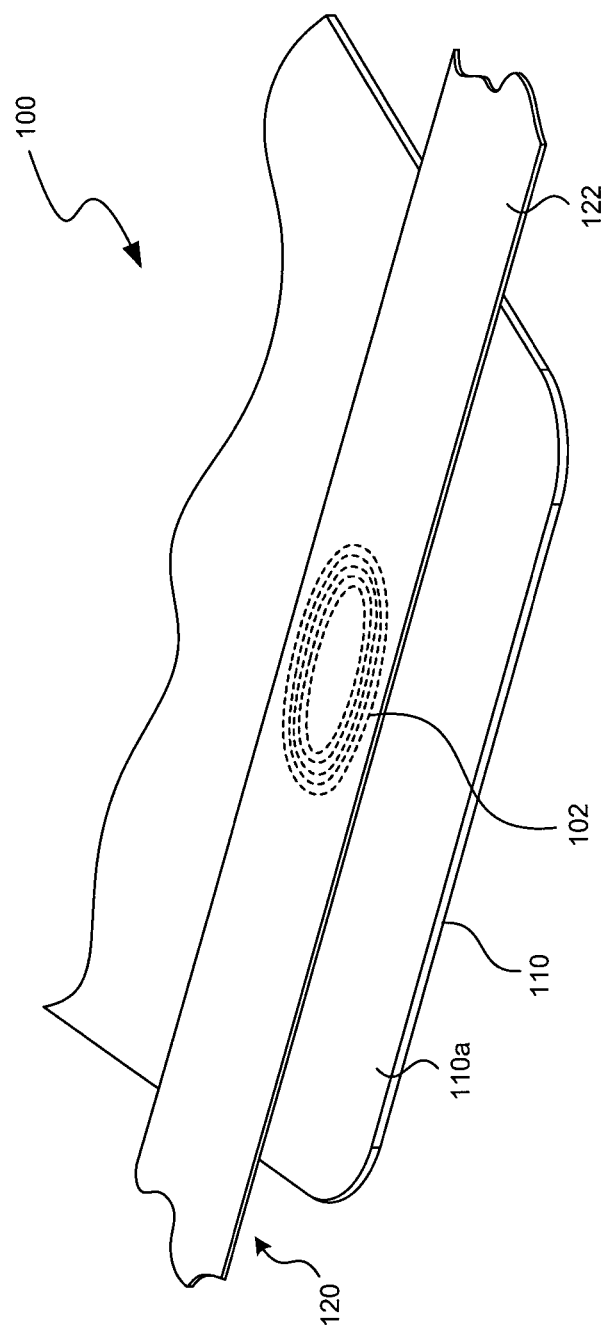
FIG. 3A is a bottom isometric view of the fastening system of FIG. 1.
Figure 3B:
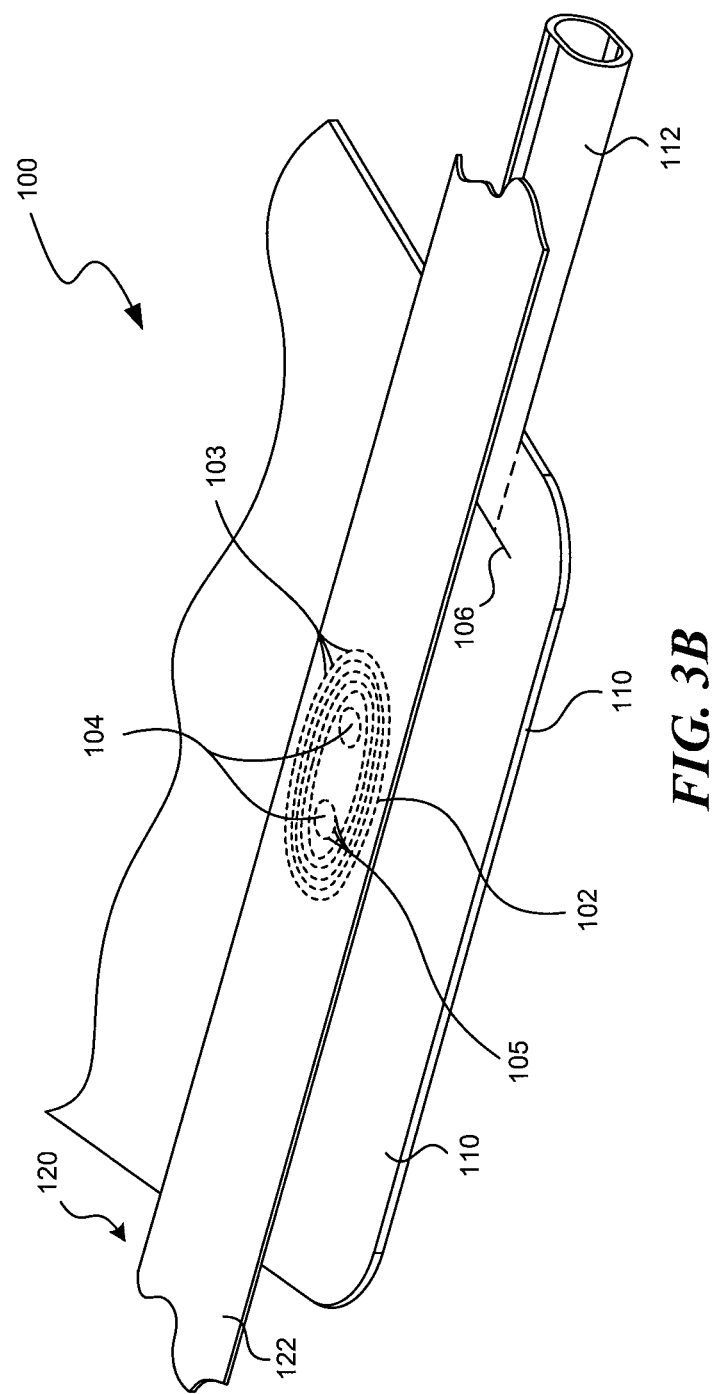
FIG. 3B is another bottom isometric view of the fastening system of FIG. 1.

FIG. 3A is an isometric view of the fastening system 100 comprising concentric rows of stitches 103 in the first stitch pattern 102 configured according to embodiments of the present disclosure showing an underside of the web 122 and the first layer 110a of the airbag 110. In some embodiments, the first stitch pattern 102 can be sewn into the web 122 and the first layer 110a before attaching the gas tube 112 via the second stitch pattern 104 (shown in FIGS. 1 and 2) or with another attachment mechanism. FIG. 3B is an isometric view showing the underside of the web 122 after the gas tube 112 has been added and stitched to the web 122 and airbag 110 with the stitches 105 forming the second, circular stitch pattern 104.

Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Furthermore, various embodiments of the disclosure can include structures other than those illustrated in the Figures and are expressly not limited to the structures shown in the Figures. Moreover, the various elements and features illustrated in the Figures may not be drawn to scale.

From the foregoing, it will be appreciated that specific embodiments have been described herein for purposes of illustration, but that various modifications may be made without deviating from the spirit and scope of the various embodiments of the disclosure. For example, the attachment stitch patterns for the restraint systems described above can include different patterns, including different curvilinear patterns in addition to those illustrated in the Figures. Moreover, specific elements of any of the foregoing embodiments can be combined or substituted for elements in other embodiments. For example, the stitches 103 of the first stitch pattern 102 can be different than the stitches 105 of the second stitch pattern. Also, the restraint assemblies described can be implemented in a number of other non-automobile or non-aircraft systems. Certain aspects of the disclosure are accordingly not limited to automobile or aircraft systems. Furthermore, while advantages associated with certain embodiments of the disclosure have been described in the context of these embodiments, other embodiments may also exhibit such advantages, and not all embodiments need necessarily exhibit such advantages to fall within the scope of the invention. Accordingly, the disclosure is not limited except as by the appended claims.

We claim:

1. A personal restraint system for use in a vehicle, the restraint system comprising:
a web configured to extend around a portion of an occupant seated in the vehicle;
an airbag;
a gas tube configured to deliver gas to the airbag; and
a fastening system attaching the airbag to the web, wherein the fastening system includes a plurality of curved rows of stitches extending through the airbag and the web, and wherein at least one individual stitch passes through the airbag, the web and the gas tube.

2. The personal restraint system of claim 1 wherein the curved rows define an oval shape having a major axis and a minor axis, and wherein the major axis is at least generally aligned with a longitudinal direction of the web and the minor axis is at least generally perpendicular to the major axis.

3. The personal restraint system of claim 2 wherein the curved rows are concentric oval-shaped rows of stitches.

4. The personal restraint system of claim 1 wherein an angle between any two consecutive stitches is less than approximately 10°.

5. The personal restraint system of claim 1 wherein the fastening system includes a row of stitches forming a spiral.

6. The personal restraint system of claim 1 wherein the curved rows of stitches are continuous with no corners at a periphery of the curved rows of stitches.

7. The personal restraint system of claim 1 wherein the airbag comprises a textile having warp threads oriented at an angle relative to a length of the web.

8. The personal restraint system of claim 7 wherein the angle is between about 0° and 90°.

9. The personal restraint system of claim 1 wherein the airbag comprises a first textile layer having warp threads oriented in a first direction and a second textile layer having warp threads oriented in a second direction different from the first direction.

10. A personal restraint system for use in a vehicle, the restraint system comprising:
a web configured to extend around a portion of an occupant seated in the vehicle;
an airbag; and
a fastening system attaching the airbag to the web, wherein the fastening system includes a plurality of curved rows of stitches extending through the airbag and the web, wherein the curved rows of stitches have an elliptical shape having two foci, and wherein the curved rows of stitches further comprise individual circular stitches at least approximately centered on the individual foci.

11. A method of constructing a vehicle restraint having an airbag, the method comprising:
positioning a gas delivery tube within the airbag, the gas delivery tube having at least one gas delivery hole positioned within the airbag;
aligning a web of the vehicle restraint with the airbag and the gas delivery tube; and
stitching thread through the web, the airbag, and the gas delivery tube in a plurality of curvilinear rows of stitches, wherein at least one individual stitch passes through the web, the airbag and the gas delivery tube.

12. A method of constructing a vehicle restraint having an airbag, the method comprising:
positioning a gas delivery tube within the airbag, the gas delivery tube having at least one gas delivery hole positioned within the airbag;
aligning a web of the vehicle restraint with the airbag and the gas delivery tube; and
stitching thread through the web, the airbag, and the gas delivery tube in a plurality of curvilinear rows of stitches, wherein stitching thread through the web, the airbag, and the gas delivery tube comprises stitching a concentric spiral-shaped row of stitches through the web, the airbag, and the gas delivery tube in a single stitch procedure.

13. A method of constructing a vehicle restraint having an airbag, the method comprising:
positioning a gas delivery tube within the airbag, the gas delivery tube having at least one gas delivery hole positioned within the airbag;
aligning a web of the vehicle restraint with the airbag and the gas delivery tube; and
stitching thread through the web, the airbag, and the gas delivery tube in a plurality of curvilinear rows of stitches, wherein stitching thread through the web, the airbag, and the gas delivery tube comprises stitching a plurality of discrete, concentric, oval-shaped rows of stitches through at least the web and the airbag in a single stitch procedure.

14. A method of constructing a vehicle restraint having an airbag, the method comprising:
positioning a gas delivery tube within the airbag, the gas delivery tube having at least one gas delivery hole positioned within the airbag;
aligning a web of the vehicle restraint with the airbag and the gas delivery tube; and
stitching thread through the web, the airbag, and the gas delivery tube in a plurality of curvilinear rows of stitches, wherein stitching thread through the web and the airbag comprises stitching a plurality of curvilinear rows of stitches comprising concentric, oval-shaped rows of stitches, and wherein stitching thread through the gas delivery tube comprises stitching thread in a discrete circular pattern of stitches through the web, the airbag, and the gas delivery tube, and further wherein the circular pattern of stitches is positioned within the concentric, oval-shaped stitches.

15. A method of constructing a vehicle restraint having an airbag, the method comprising:
positioning a gas delivery tube within the airbag, the gas delivery tube having at least one gas delivery hole positioned within the airbag;
aligning a web of the vehicle restraint with the airbag and the gas delivery tube;
fixing the web, the airbag, and the gas delivery tube in a jig; and
stitching thread through the web, the airbag, and the gas delivery tube in a plurality of curvilinear rows of stitches.

16. A vehicle restraint, comprising:
a web configured to restrain a passenger in the vehicle;
an airbag stitched to the web with a plurality of first individual stitches forming a first curvilinear pattern, wherein the first individual stitches comprise generally straight stitches, and further wherein an angle between any two consecutive individual stitches is less than about 10°; and
a gas delivery tube stitched to the airbag and to the web with a plurality of second individual stitches forming a second curvilinear pattern, wherein the gas delivery tube comprises a gas exit port positioned within the airbag, and wherein at least one individual stitch passes through the web, the airbag and the gas delivery tube.

17. The vehicle restraint of claim 16 wherein the angle between any two consecutive individual stitches is less than about 5°.

18. The vehicle restraint of claim 16 wherein the first curvilinear pattern comprises a plurality of concentric ovals.

19. The vehicle restraint of claim 16 wherein the first curvilinear pattern comprises a spiral.

20. The vehicle restraint of claim 16 wherein the first individual stitches pass through the web, the airbag, and the gas delivery tube.

21. The vehicle restraint of claim 16 wherein the first individual stitches pass through the web and the airbag, and wherein the second individual stitches pass through the web, the airbag, and the gas delivery tube.

22. The vehicle restraint of claim 16 wherein the web is configured to restrain a passenger in an aircraft.

23. The vehicle restraint of claim 16 wherein the first stitch pattern does not overlap with the second stitch pattern.

* * * * *